United States Patent
Muscas

(10) Patent No.: US 9,970,384 B2
(45) Date of Patent: May 15, 2018

(54) STEEL PISTON WITH COOLING GALLERY AND METHOD OF CONSTRUCTION THEREOF

(75) Inventor: Florin Muscas, Novi, MI (US)

(73) Assignee: Federal-Mogul LLC, Southfield, MI (US)

(*) Notice: Subject to any disclaimer, the term of this patent is extended or adjusted under 35 U.S.C. 154(b) by 1061 days.

(21) Appl. No.: 13/112,772

(22) Filed: May 20, 2011

(65) Prior Publication Data

US 2012/0037112 A1 Feb. 16, 2012

Related U.S. Application Data

(63) Continuation-in-part of application No. 12/896,202, filed on Oct. 1, 2010, now Pat. No. 8,807,109.

(60) Provisional application No. 61/258,956, filed on Nov. 6, 2009.

(51) Int. Cl.
| | | |
|---|---|---|
| F02F 3/00 | (2006.01) | |
| F02F 3/22 | (2006.01) | |
| F02B 23/06 | (2006.01) | |

(52) U.S. Cl.
CPC ............ *F02F 3/22* (2013.01); *F02B 23/0672* (2013.01); *F02F 3/003* (2013.01); *F02F 2003/0061* (2013.01); *Y02T 10/125* (2013.01)

(58) Field of Classification Search
CPC ........ F02F 3/00; F02F 3/16; F02F 3/28; F02F 3/26; F02F 3/0015; F02B 23/0696
USPC ................. 123/193.6, 197.3, 41.35; 3/193.6; 92/208, 186
See application file for complete search history.

(56) References Cited

U.S. PATENT DOCUMENTS

| | | | |
|---|---|---|---|
| 2,506,811 A | 5/1950 | Robert | |
| 2,974,541 A | * 3/1961 | Dolza | ......................... 74/579 R |
| 3,221,718 A | 12/1965 | Isley | |
| 3,914,574 A | 10/1975 | Hill et al. | |
| 4,651,631 A | 3/1987 | Avezou | |

(Continued)

FOREIGN PATENT DOCUMENTS

| | | |
|---|---|---|
| CN | 1685141 A | 10/2005 |
| CN | 101903633 A | 12/2010 |

(Continued)

OTHER PUBLICATIONS

International Search Report PCT/US2012/030790 dated Aug. 14, 2012.

*Primary Examiner* — Marguerite McMahon
*Assistant Examiner* — James Kim
(74) *Attorney, Agent, or Firm* — Robert L. Stearns; Dickinson Wright, PLLC

(57) ABSTRACT

A piston and method of construction is provided. The piston includes a top part fixed to a bottom part. The top part has an uppermost surface with annular inner and outer upper joining surfaces depending therefrom. The bottom part has a pair of pin bosses with pin bores aligned with one another along a pin bore axis; a pair of upwardly extending annular inner and outer lower joining surfaces and a combustion bowl wall. Inner and outer weld joints fix the inner and outer upper and lower joining surfaces to one another. An annular cooling gallery is formed laterally between the upper and lower joining surfaces. The inner weld joint joining the top part to the bottom part is located within the combustion bowl wall and configured to minimized the compression height of the piston.

18 Claims, 11 Drawing Sheets

(56) References Cited

U.S. PATENT DOCUMENTS

| | | | | |
|---|---|---|---|---|
| 4,727,795 | A * | 3/1988 | Murray | F02F 3/0015 123/193.6 |
| 4,831,917 | A | 5/1989 | Houben et al. | |
| 5,076,225 | A | 12/1991 | Tokoro et al. | |
| 5,158,008 | A * | 10/1992 | Ripberger | F02F 3/025 123/193.6 |
| 5,331,932 | A * | 7/1994 | Watanabe et al. | 123/193.6 |
| 5,595,145 | A | 1/1997 | Godo | |
| 5,605,126 | A * | 2/1997 | Hofmann et al. | 123/276 |
| 5,890,416 | A * | 4/1999 | Thieme | F02F 3/22 123/41.35 |
| 5,894,824 | A * | 4/1999 | Watanabe et al. | 123/193.6 |
| 6,026,777 | A * | 2/2000 | Kemnitz et al. | 123/193.6 |
| 6,112,715 | A * | 9/2000 | Nigro et al. | 123/279 |
| 6,164,249 | A * | 12/2000 | Honold | F02F 3/22 123/41.35 |
| 6,499,386 | B2 * | 12/2002 | Martin | F02F 3/22 92/186 |
| 6,557,514 | B1 * | 5/2003 | Gaiser | 123/193.6 |
| 7,472,674 | B2 * | 1/2009 | Robelet | 123/193.6 |
| 7,503,304 | B2 * | 3/2009 | Otsuka | B22D 30/00 123/193.6 |
| 7,533,601 | B2 * | 5/2009 | Lapp et al. | 92/186 |
| 8,074,617 | B2 * | 12/2011 | Grahle | F02F 3/003 123/193.6 |
| 2002/0162448 | A1 | 11/2002 | Martin et al. | |
| 2003/0037671 | A1 * | 2/2003 | Zhu et al. | 92/231 |
| 2003/0075042 | A1 | 4/2003 | Gaiser et al. | |
| 2004/0055460 | A1 | 3/2004 | Kohnert | |
| 2004/0261752 | A1 | 12/2004 | Rein et al. | |
| 2006/0278180 | A1 * | 12/2006 | Scharp | 123/41.35 |
| 2007/0107215 | A1 | 5/2007 | Scharp | |
| 2007/0144343 | A1 | 6/2007 | Douglas | |
| 2008/0121102 | A1 | 5/2008 | Scharp et al. | |
| 2008/0250922 | A1 * | 10/2008 | Hayes | F01M 11/02 92/158 |
| 2008/0264376 | A1 | 10/2008 | Braig et al. | |
| 2009/0194059 | A1 | 8/2009 | Grahle et al. | |
| 2010/0107998 | A1 | 5/2010 | Scharp et al. | |
| 2010/0300397 | A1 * | 12/2010 | Lapp et al. | 123/197.3 |
| 2011/0107997 | A1 | 5/2011 | Muscas et al. | |

FOREIGN PATENT DOCUMENTS

| | | |
|---|---|---|
| DE | 19930630 | 10/2000 |
| DE | 10200905820 A1 | 10/2010 |
| EP | 0000592 | 2/1979 |
| EP | 1084793 | 3/2001 |
| JP | S495121 B | 2/1974 |
| JP | S54028949 A | 3/1979 |
| JP | S59137352 U | 9/1984 |
| JP | S6026254 U | 2/1985 |
| JP | S60172771 A | 9/1985 |
| JP | S6151454 U | 4/1986 |
| JP | S61187943 U | 11/1986 |
| JP | H0389958 U | 9/1991 |
| JP | H1078129 A | 3/1998 |
| JP | 2001082247 A | 4/2001 |
| JP | 2001107803 A | 4/2001 |
| JP | 2003526755 A | 9/2003 |
| JP | 2005501197 A | 1/2005 |
| JP | 2005507042 A | 3/2005 |
| JP | 2007512487 A | 5/2007 |
| JP | 2007270812 A | 10/2007 |
| JP | 2007270813 A | 10/2007 |
| JP | 2009522480 A | 6/2009 |
| WO | 200250414 | 6/2002 |
| WO | 2007093289 | 8/2009 |
| WO | 2011056822 A2 | 5/2011 |

* cited by examiner

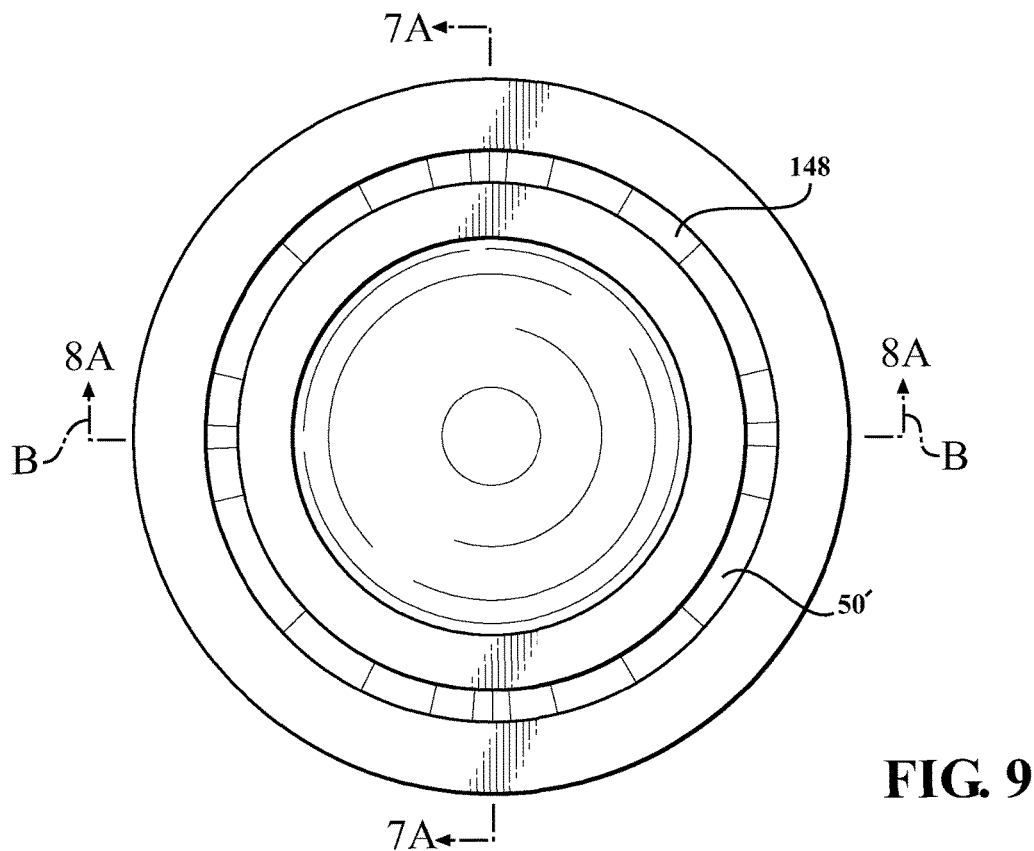
FIG. 9
FIG. 10
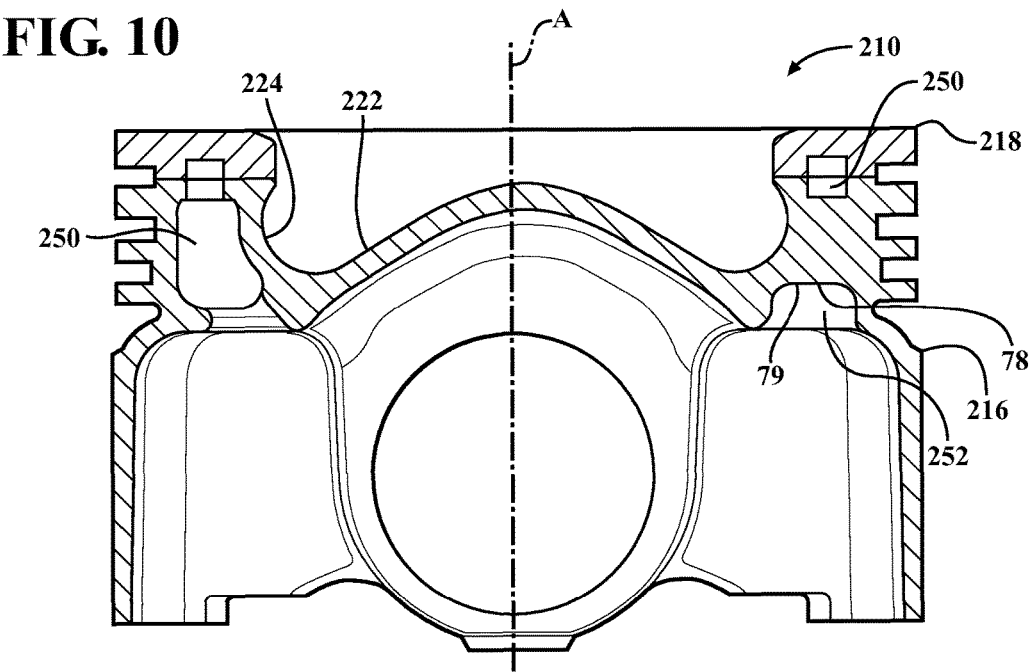

STEEL PISTON WITH COOLING GALLERY AND METHOD OF CONSTRUCTION THEREOF

CROSS-REFERENCE TO RELATED APPLICATIONS

This application is a Continuation-in-Part and claims the benefit of U.S. application Ser. No. 12/896,202 now U.S. Pat. No. 8,807,109, filed Oct. 1, 2010 and U.S. Provisional Application Ser. No. 61/258,956, filed Nov. 6, 2009, which is incorporated herein by reference in its entirety.

BACKGROUND OF THE INVENTION

1. Technical Field

This invention relates generally to internal combustion engines, and more particularly to pistons and their method of construction.

2. Related Art

Engine manufacturers are encountering increasing demands to improve engine efficiencies and performance, including, but not limited to, improving fuel economy, reducing oil consumption, improving fuel systems, increasing compression loads within the cylinder bores, reducing heat lost through the piston, reducing friction losses, decreasing engine weight and making engines more compact. In order to achieve these goals, the piston size and their compression height need to be reduced. However, while desirable to increase compression loads within the combustion chamber, it remains necessary to maintain the piston within workable limits. As such, although desirable to increase compression loads within the combustion chamber, there is a tradeoff in that these "increases" limit the degree of which the compression height, and thus, overall engine size, can be decreased. Further, the degree to which the engine weight can be reduced is compromised in that the increase of mechanical and thermal loads imposed on the piston require that they be made of steel.

A piston constructed in accordance with this invention overcomes the aforementioned disadvantages of known piston constructions and other disadvantages, as will become apparent to those skill in the art upon reading the disclosure and viewing the drawings herein.

SUMMARY OF THE INVENTION

A piston constructed in accordance with this invention is constructed of steel, thereby providing the piston with enhanced strength and durability to withstand increased compression loads within a cylinder bore, such as those seen in modern high performance engines. Further, due to the novel configuration of the piston, the compression height (CH) and weight of the piston are able to be minimized, thereby allowing an engine in which the pistons are deployed to be made more compact and lightweight.

According to one aspect of the invention, a piston for an internal combustion engine, compromises an upper piston part; a lower piston part; at least the lower piston part being fabricated from a ferrous based material; the lower piston part having a pair of pin bosses formed with associated pin bores aligned along a pin bores axis; the lower piston further including a pair of piston skirt portions that are formed of one piece with the pin bosses of the same material; the upper and lower piston parts each including an outer annular wall and an inner annular wall spaced radially apart from one another and presenting a channel portion between each of the inner and outer walls; the inner and outer walls of the upper piston part being permanently joined across inner and outer weld joints to the respective inner and outer walls of the lower piston part to define therebetween an annular cooling gallery that has two side walls provided by the joined together inner and outer walls, an annular top wall formed by the upper piston part and a lower wall formed by the lower piston part; the joined together upper and lower piston parts including a combustion bowl defined in part by an inner surface of the joined together inner walls, and further including a generally dome-shaped bottom wall of the combustion bowl extending radially inwardly of the inner wall of the lower piston part; the inner weld joint being exposed to the combustion bowl; the joined together piston parts including a piston height dimension, PH, measured from a bottom edge of the pin boss to a top face of the upper wall; the joined together piston parts including a compression height dimension, CH, measured from said pin bore axis to the top face of the upper wall; the joined together piston parts including a piston diameter, PD, measured as the outer diameter of the upper wall; and wherein D equals about 103 mm, CH equals about 40 mm and the ratio of CH/PH equals about ⅔.

In accordance with another aspect of the invention, a piston is constructed including a top part having an uppermost surface with annular inner and outer upper joining surfaces depending from the uppermost surface. The piston further includes a bottom part having a pair of pin bosses providing a pair of laterally spaced pin bores aligned with one another along a pin bore axis and having a pair of upwardly extending annular inner and outer lower joining surfaces joined by separate respective inner and outer weld joints to the inner and outer upper joining surfaces with an annular cooling gallery extending laterally between the upper joining surfaces and the lower joining surfaces. The bottom part has a combustion bowl wall recessed below the uppermost surface, wherein the combustion bowl wall has a thickness extending between an upper apex and a lower apex underlying the upper apex with an annular valley surrounding the upper apex and the lower apex, wherein the thickness of the combustion bowl wall is substantially constant.

In accordance with another aspect of the invention, a piston is constructed including a top part having an uppermost surface with annular inner and outer upper joining surfaces depending from the uppermost surface. The piston further includes a bottom part having a pair of pin bosses providing a pair of laterally spaced pin bores axially aligned along a pin bore axis and having a pair of upwardly extending annular inner and outer lower joining surfaces joined by separate respective inner and outer weld joints to the inner and outer upper joining surfaces with an annular cooling gallery formed between the upper joining surfaces and the lower joining surfaces. The top part and the bottom part form a piston head region having an outer diameter, wherein a compression height of the piston extends between the uppermost surface of the top part and the pin bore axis. The compression height ranges between about 38% to 45% of the piston outer diameter.

In accordance with another aspect of the invention, a piston for an internal combustion engine, comprises an upper piston part having radially spaced inner and outer joining surfaces; a lower piston part with radially spaced joining surfaces and fabricated of ferrous based material; inner and outer weld joints permanently joining the inner and the outer joining surfaces of the upper and the lower piston parts, respectively, and defining a cooling gallery therebetween and a combustion bowl inward of the cooling gallery and open to a top of the piston; the inner weld joint extending between the cooling gallery and the combustion bowl; the lower piston part including a pair of pin bosses and associated pin bores aligned along a common pin bore axis, and a pair a skirt portions formed as one piece with the pin bosses of the material; the piston having a top face with an outer piston diameter, PD, and a compression height, CH, measured as the distance from the pin bore axis and the top face of the piston; and wherein CH is between 38% to 45% of PD.

The advantage of such a piston is that it enables the manufacture of a very strong but compact piston, with all of the performance benefits of the larger style cooled pistons usually associated with heavy duty piston applications but in a small package size for use in smaller engines.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 9 is a top view of the bottom part of the piston of FIG. 6;

FIG. 10 is a cross-sectional side view of a piston constructed in accordance with another aspect of the invention taken generally through a longitudinal central axis and transversely to a pin bore axis of the piston;

DETAILED DESCRIPTION OF PRESENTLY PREFERRED EMBODIMENTS

Figure 1:
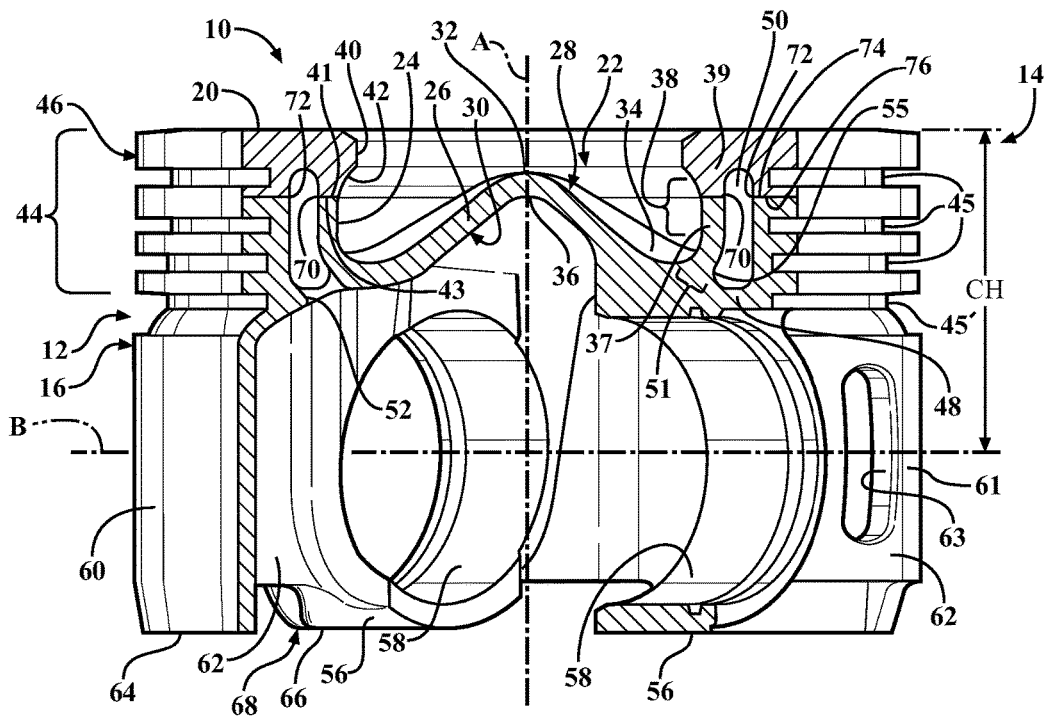
FIG. 1 is a partially sectioned perspective view of a piston constructed in accordance with one aspect of the invention.
Figure 2:
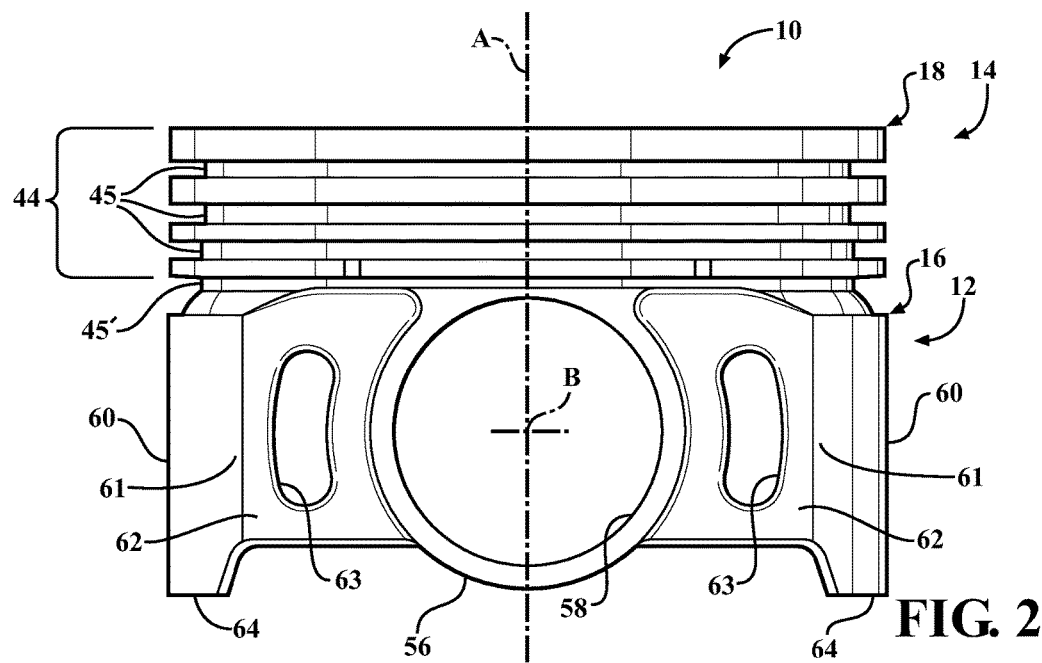
FIG. 2 is a side view of the piston of FIG. 1.

Referring in more detail to the drawings, FIG. 1 illustrates a partially sectioned perspective view of a piston 10 constructed in accordance with one presently preferred embodiment of the invention for reciprocating movement in a cylinder bore or chamber (not shown) of an internal combustion engine, such as a modern, compact, high performance vehicle engine, for example. The piston 10 has a body 12 made of at least two separate pieces that are initially fabricated as separate parts and subsequently joined to one another within a head region 14 across some form in of a weld joint (i.e., induction weld, friction weld, braze joint, charge carrier rays, laser, resistance, and the like). The two parts comprise a bottom part 16, and a top part 18. Reference to "top", "bottom", "upper" and "lower" herein are relative to the piston being oriented along a vertical longitudinal central piston axis A along which the piston 10 reciprocates in use. This is for convenience and is not to be limiting since it is possible that the piston may be installed and operate at an angle or other than purely vertical. At least the bottom part 16 of the piston 10 is east of steel to near net shape, such as in an investment casting process. The top part 18 of the piston 10 may also be fabricated of steel as a separate piece from that of the bottom part 16. The material (i.e., the steel alloy) used to construct the bottom and top parts 16, 18 may be the same (e.g., SAE 4140 grade) or different, depending on the requirements of the piston 10 in the particular engine application. The top part 18 may be cast, may be machined from stock, may be sintered, forged or made by any number of processes. The bottom and top parts 16, 18, being constructed of steel, provide the piston 10 with enhanced strength and durability to withstand increased compression loads within the cylinder bore, and due to their novel configuration, minimize the weight and compression height (CH) of the piston 10, thereby allowing an engine in which the pistons 10 are deployed to achieve a reduced weight and to be made more compact.

Figure 3:
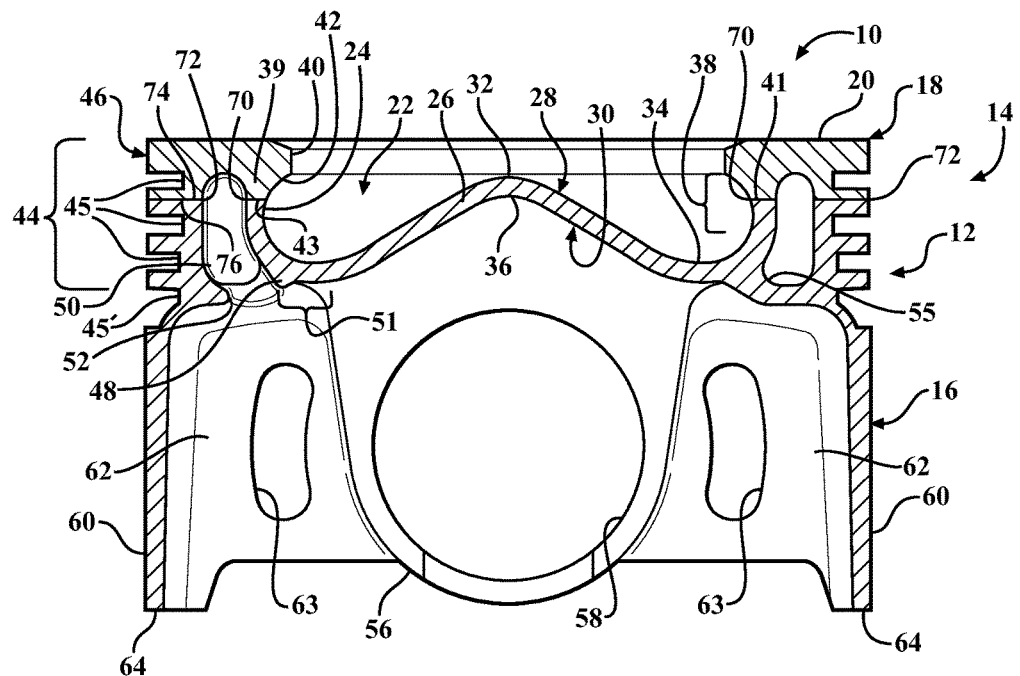
FIG. 3 is a cross-sectional side view of the piston of FIG. 1 taken generally through a longitudinal central axis and transversely to a pin bore axis of the piston.
Figure 4:
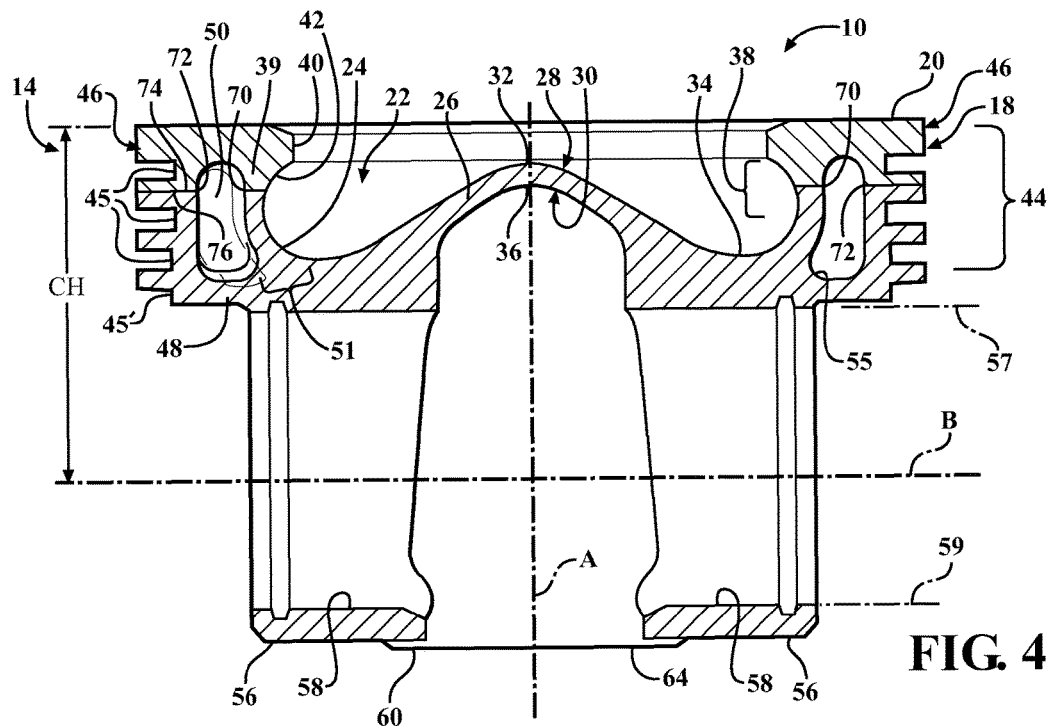
FIG. 4 is a cross-sectional side view of the piston of FIG. 1 taken generally along the pin bore axis.

As shown in FIGS. 1, 3 and 4, the head region 14 of the piston 10 has an annular top wall 20 which surrounds an annular combustion bowl 22 that is recessed below an uppermost combustion surface of the top wall 20. The combustion bowl 22 is demarcated by a wall 24 that includes a centrally located thin-walled bottom or floor 26 having a uniform or constant thickness extending between an upper surface 28 and an underlying undercrown surface, also referred to as bottom surface 30. The contour of the combustion bowl 22 is formed by the upper surface 28, wherein the upper surface 28 is shown as being contoured to provide an upper apex or center peak 32 that may lie coaxially along the central axis A of the piston 10 or may be radially offset relative to the piston central axis A, such as discussed further below with relation to FIGS. 6-9. The contour of the combustion bowl wall 24 also provides an annular valley 34 which surrounds the peak 32, shown as being concentric in relation to the peak 32 and forming the lowest portion of the combustion bowl 24. With the floor 26 having a constant, or substantially constant thickness, ranging between about 2.5% to 4.0% of the piston head outer diameter, the bottom surface 30 follows or substantially follows the contour of the combustion bowl upper surface 28. Thus, an elevated lower apex or peak 36 is formed directly underlying the upper apex 32 to provide maximum available space to accommodate the wrist pin end, also referred to as small end, of the connecting rod (not shown). Accordingly, the small end of the connecting rod can be increased in size to provide enhanced guidance and stability to the piston during reciprocation.

Figure 3A:
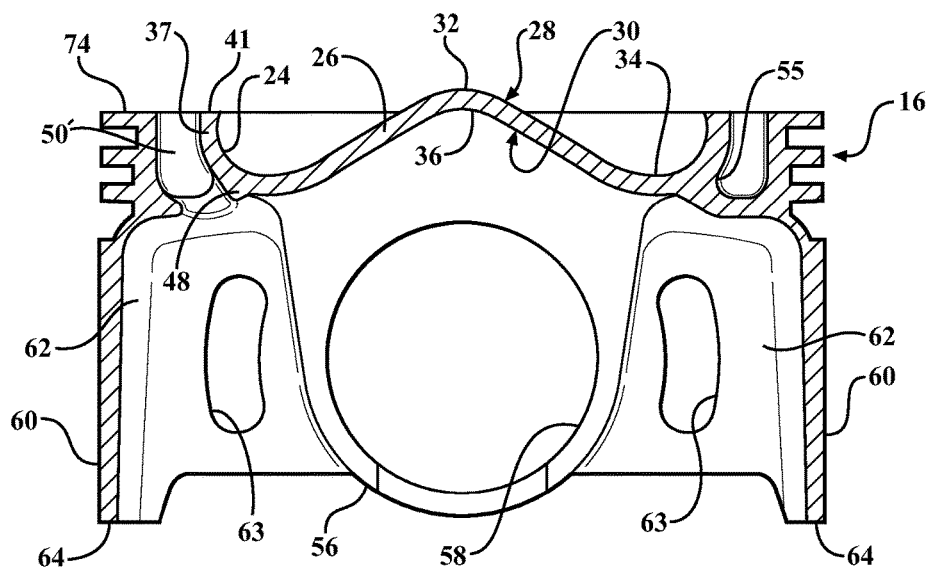
FIG. 3A is a cross-sectional side view of a bottom part of the piston of FIG. 1 taken generally along the same axis as FIG. 3.
Figure 4A:
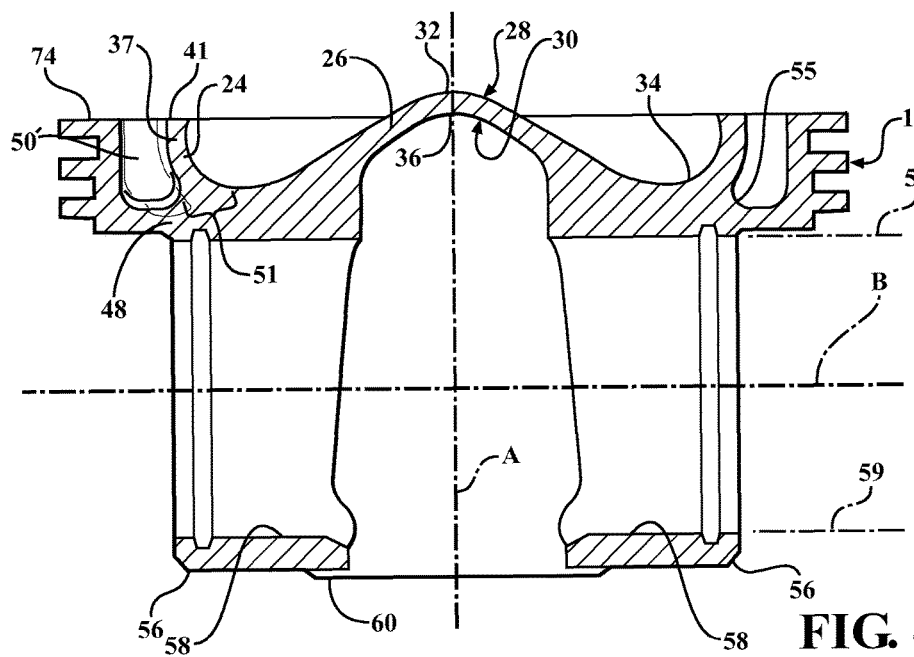
FIG. 4A is a cross-sectional side view of the bottom part of the piston of FIG. 1 taken generally along the same axis as FIG. 4.

As best shown in FIGS. 3A and 4A, the bottom part 16 of the piston 10 is fabricated to include the floor 26, and thus, both the peak 32 and the valley 34 of the combustion bowl 22. Referring again to FIGS. 1, 3 and 4, the combustion bowl 22 further includes a peripheral annular upstanding side wall 38 which surrounds and extends upwardly from the floor 26 of the combustion bowl 22 near the valley 34 to the top wall 20 of the head region 14. The combustion bowl side wall 38 is formed partially by the bottom part 16 and partially by the top part 18 of the piston 10. Accordingly, the side wall 38 includes a lower side wall portion 37 (FIGS. 3A and 4A) provided by the bottom part 16 and an upper side wall portion 39 (FIGS. 1, 3 and 4) provided by the top part 18. An uppermost region of the combustion bowl upper side wall portion 39 provides an annular radially inwardly projecting lip or rim 40 of the combustion bowl 22 formed entirely by the top part 18, such that the side wall 38 of the combustion bowl 22 is undercut to provide an annular reentrant cavity 42 in the top part 18 of the piston 10. The annular lower and upper side wall portions 37, 39 each have lower and upper end joining surfaces 41, 43, respectively, that are welded to one another in construction of the piston 10. The lower end joining surface 41 is shown as being coplanar or substantially coplanar with the underlying peak 36 of the combustion bowl floor 26, by way of example and without limitation, and thus, the center peak 32 extends above the plane of the lower end joining surface 41.

The head region 14 of the piston 10 further includes an annular ring belt 44 formed in an annular outer wall 46 of the piston 10. The outer wall 46 extends downwardly from the top wall 20, wherein an upper portion of the outer wall 46 is provided by the top part 18 of the piston 10, and a remaining bottom portion of the outer wall is provided by the bottom part 16. The upper portion of the outer wall 46 depends from the top wall 20 to an annular, outer, upper joining surface 47 while the lower portion of the outer wall 46 extends upwardly to an annular, outer, lower joining surface 49. An upper portion of the ring belt 44 is shown as being form in the upper portion of the outer wall 46 within the top part 18 of the piston 10 and a lower portion of the ring belt 44 is shown as being formed in the bottom portion of the outer wall 46 within the bottom part 16 of the piston 10. The ring belt 40 has a plurality of outer annular ring grooves 45 in which piston rings (not shown) are received in the usual manner. The ring grooves 45 shown include an uppermost ring groove adjacent the top wall 20 of the piston head region 14, wherein the uppermost ring groove can be formed entirely within the top part 18, between the top part 18 and the bottom part 16, or entirely within the bottom part 16, wherein the uppermost ring groove 45 is provided to receive a compression ring (not shown). In addition, a pair of lower ring grooves 45 below the uppermost ring groove 45 are shown, wherein the pair of lower ring grooves 45 are preferably formed in the bottom part 16, such as to receive an intermediate wiper ring and a lowermost oil ring (neither shown). Further yet, a bottom (fourth) annular groove or recess 45' is formed below the lowermost oil ring groove 45, wherein the annular recess 45' is formed "as cast" primarily as a weight reduction feature.

The head region 14 of the piston 10 further includes an annular bottom wall 48 that extends radially inwardly from the lower end of the ring belt 44 toward the central axis A. The bottom wall 48 is formed entirely from the material of the bottom part 16. The bottom wall 48 transitions radially inwardly over a transition region 51 into the floor 26 of the combustion bowl 22 radially inwardly of the side wall 38 of the combustion bowl 22.

The annular bottom wall 48 of the head region 14 is spaced in axial alignment along the central axis A from the top wall 20, and the outer wall 46 of the ring belt 44 is spaced radially outwardly from the inner combustion bowl side wall 38. As such, as shown in longitudinal cross-section, these walls 48, 20, 46, 38 form an annular, torpid-shaped box structure that bound a substantially enclosed, circumferentially continuous oil gallery 50 within the piston head region 14. An upper region of the oil gallery 50 is formed by the top part 18 of the piston 10 and a lower region of the oil gallery 50 is formed by the bottom part 16 of the piston 10. The bottom wall, also referred to as floor 48, of the oil gallery 50 is formed with at least one oil feed or inlet 52 that is open to the bottom of the piston 10 and is in direct fluid communication with the oil gallery 50 for introducing a flow of cooling oil from a supply source (not shown), such as from an oil jet during operation of the diesel engine in which the piston 10 is to be installed. If the bottom part 12 of the piston is fabricated by casting (e.g., investment cast), then the oil inlet 52 may be formed as a "cast-in" feature rather than being subsequently formed by a machining operation. The bottom wall 48 may also include at least one oil drain hole or outlet 54 that is open to the bottom of the piston 10 and is in open fluid communication with the oil gallery 50 for draining oil from the gallery 50 back into the crankcase of the engine during operation. The at least one oil drain hole 54 may likewise be a "cast-in" feature of the bottom piston part 16. While it is preferred to avoid secondary or downstream processes to form the inlet and outlet 48, 50 by casting them directly in the bottom part 16, they can also be machined or otherwise processed, if desired. In addition, the bottom wall 48 can be formed "as east" to provide an annular undercut region to provide an annular reentrant portion 55 of the oil gallery 50 extending radially inwardly beneath at least a portion of the side wall 38 to maximize the cooling effect of the oil within the cooling gallery 50 on the combustion bowl 22.

The bottom part 16 further includes a pair of pin bosses 56 configured to depend from the top part 18. The pin bosses 56 each have a pin bore 58, preferably bushless given the steel construction, wherein the pin bores 58 are spaced from one another coaxially along a pin bore axis B that extends transverse to the central longitudinal axis A. The pin bores 58 each have an uppermost surface extending tangent with an uppermost tangent plane 57 and a lowermost surface extending tangent with a lowermost tangent plane 59, wherein the tangent planes 57, 59 extend parallel to one another and transverse to the central axis A. The pin bosses 56 are joined to skirt portions, also referred to as skirt panels 60, that are formed as a monolithic piece of material with the bottom part 16 and are thus, formed integrally as a monolithic piece of material with the pin bosses 56.

The skirt panels 60 are joined along their longitudinally extending sides 61 directly to the pin bosses 56 via windows, also referred to as strut portions 62, such that the skirts panels 60 are arranged diametrically opposite one another across opposite sides of the pin bosses 56. One or more of the strut portions 62 can be formed having an opening 63, wherein the openings 63 are shown as elongate, arcuate oval or generally peanut-shaped openings extending generally lengthwise along the central axis A. The openings 63 are preferably formed "as east" with the bottom part 16, though they could be machined or processed subsequent to casting, if desired for additional weight reduction.

Figure 5:
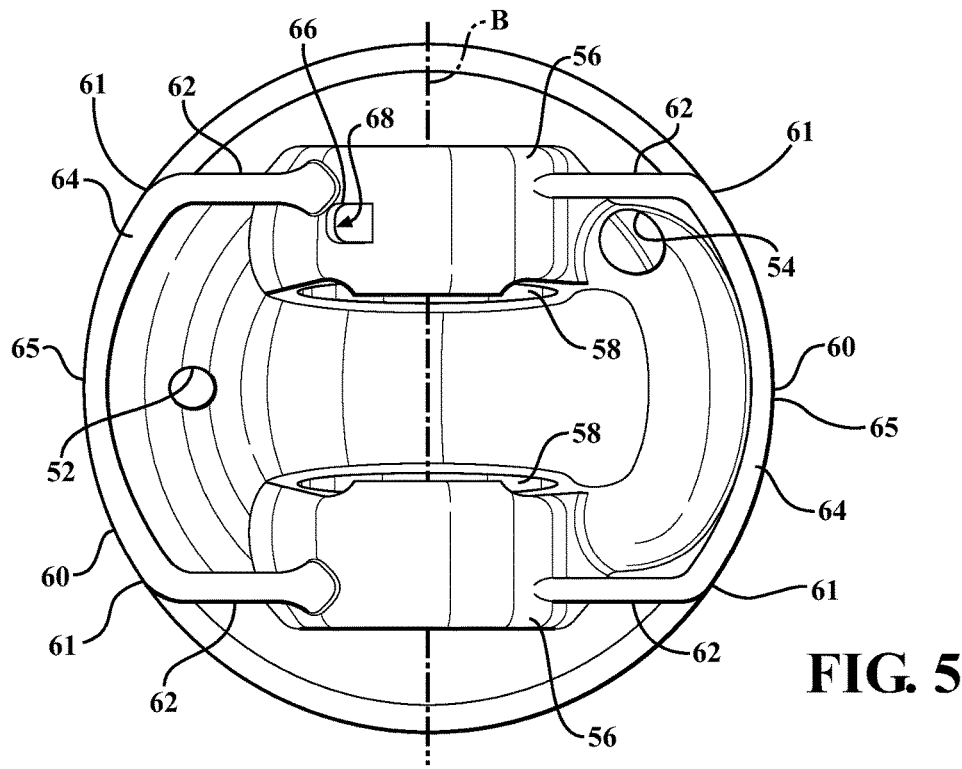
FIG. 5 is a bottom view of the piston of FIG. 1.

The skirt panels 60 have convex outer surfaces extending between their respective sides 61 across a central region 65, wherein the outer surfaces are contoured for smooth, mating cooperation with a wall of the cylinder bore to maintain the piston 10 in a desired orientation as it reciprocates through the cylinder bore. The skirt panels 60 are constructed having a thickness ranging between about 2.0% to 3.0% of the piston head outer diameter. As best shown in FIG. 5, to provide an enhanced skirt stiffness and uniformity of skirt contact pressure against the cylinder liner, and to provide enhanced guidance of the piston during reciprocation within the cylinder liner, the outer edges 61 of the skirt panels 60 are slightly thicker than the central region 65, such that the skirt panels 60 have a continuous wall thickness variation extending from one side 61 to the opposite side 61 of a respective skirt panel 60. The sides 61 are the same or substantially the same thickness, while the central region 65 has a reduced thickness of about 5% relative to the sides 61. Thus, while the outer surface of the skirt panels have a constant or substantially constant radius of curvature, an inner surface of the skirt panels 60 has a varying radius of curvature.

The skirt panels 60 are each joined at their upper ends and formed as one piece (e.g., cast) with the lower portion of the ring belt 44, wherein the annular recess 45' extends between the skirt upper ends and the lowermost ring groove 45. The skirt panels 60 extend longitudinally generally parallel with the central axis A downward from the ring belt 44 to bottom or lower ends 64 which are spaced below the lowermost tangent planes 59 of the pin bores 58. At least one of the pin bosses 56 is formed with a datum pad 66 that projects downwardly from the bottom of the pin boss 56 to provide a flat reference surface 68 used in manufacture. The reference surface 60 is co-planer with the lower ends 64 of the skirt panels 60.

A weld joint 70 that unites the separately made top and bottom parts 18, 16 of the piston 10 extends at least through the side wall 38 of the combustion bowl 22 upon welding the radially inner annular lower joining surface 41 of the bottom part 16 to the radially inner annular upper joining surface 43 of the top part 18. Thus, the weld joint 70 is open to the combustion bowl 22 above the valley 34 and below the center peak 32 and the rim 40 of the combustion bowl 22. The weld joint 70 is also spaced axially above the lowest portion of the oil gallery, formed by the lower wall 48, which itself is spaced below the valley 34 of the combustion bowl 22.

In addition to the weld joint 70 extending through the combustion bowl side wall 38, a weld joint 72 extends through at least one other wall in the head region 14. As illustrated, the weld joint 72 may extend through the outer ring belt 44 of the piston 10. The location of the ring belt weld joint 72 may be at any point along the length of the ring belt 44. As illustrated, the ring belt weld joint 72 may lie in the same plane extending transverse to the central axis A as that of the weld joint 70 in the combustion chamber side wall 38. The bottom part 16 of the piston 10 may thus include a radially outer, upwardly facing pre-joined lower joining surface 74 of the ring belt 44 and the top part 18 may thus include a radially outer, downwardly facing pre joined upper joining surface 76 of the ring belt 40. The associated lower and upper joining surfaces 41, 43; 74, 76 may be united by a selected joining process, such as induction welding, friction welding, resistance welding, charge carrier rays, electron beam welding, brazing, soldering, hot or cold diffusion, etc.

The piston 10 is adapted for use in light, modern, high performance vehicle diesel engine applications with piston head outer diameter range from about 75 mm to 105 mm. While made of steel, the piston 10, by its thin-walled design, is as light, if not lighter, than its aluminum counterparts when taking into account the mass of the aluminum piston and the associated insert pin bore bushings, etc used in aluminum piston assemblies. The steel piston 10 also has a significantly smaller compression height CH, defined as the distance extending between the central pin bore axis B and the top wall 20, than its aluminum counterpart piston (i.e., 20-30% smaller). The comparable weight and smaller CH allows the engine to be made smaller and more compact, or for the connecting rod to be longer and have an enlarged small end, given the increased available space provided between the pin bore axis B and the underlying peak 36 of the combustion bowl wall 24, so as to reduce the side load on the piston during operation.

Figure 6:
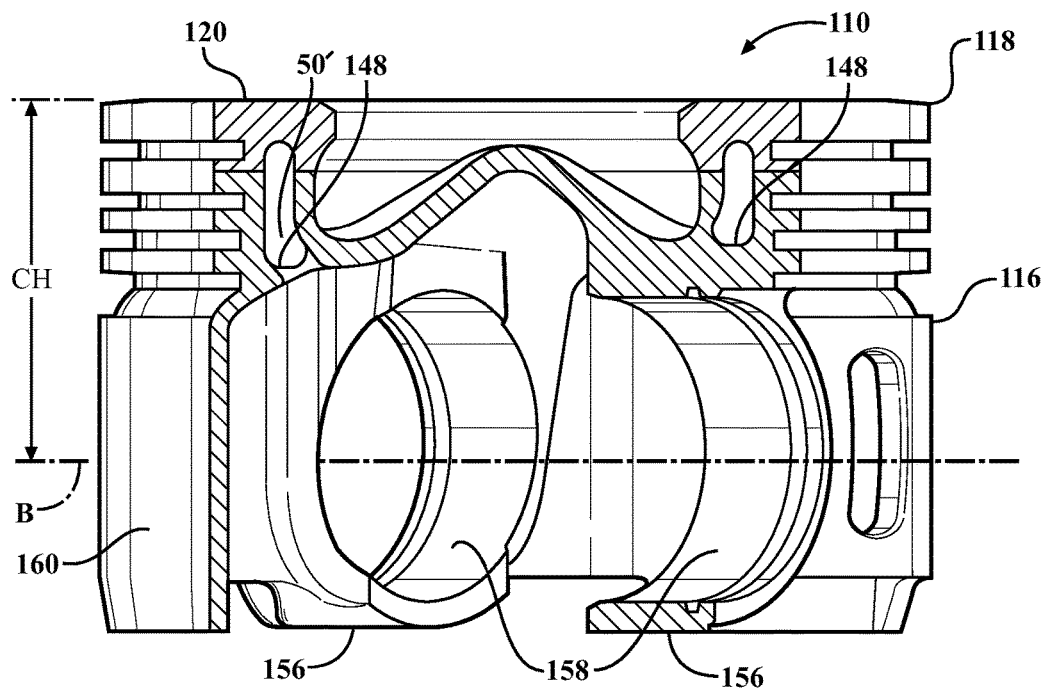
FIG. 6 is a view similar to FIG. 1 of a piston constructed in accordance with another aspect of the invention.

As mentioned, the steel piston 10 has a very short compression height CH. In comparison with prior art two-piece pistons having oil cooling galleries typical of heavy-duty diesel engine applications, it will be appreciated that the pin bosses 56, and thus their associated pin bores 58, are much higher up in the piston body 12 (the piston is more axially compact). The illustrated piston 10 has a compression height CH to piston head region outer diameter ratio of about 40.9%. Further, the distance from the pin bore axis B to the combustion bowl side wall weld joint 70 is about 27 mm. By comparison, an aluminum piston for a similar application would have about 20-30% greater CH to piston head region outer diameter ratio.

in FIG. 6, a piston 110 constructed in accordance with another aspect of the invention is shown, wherein the same reference numerals used above, offset by a factor of 100, are used to identify like features.

Figure 7:
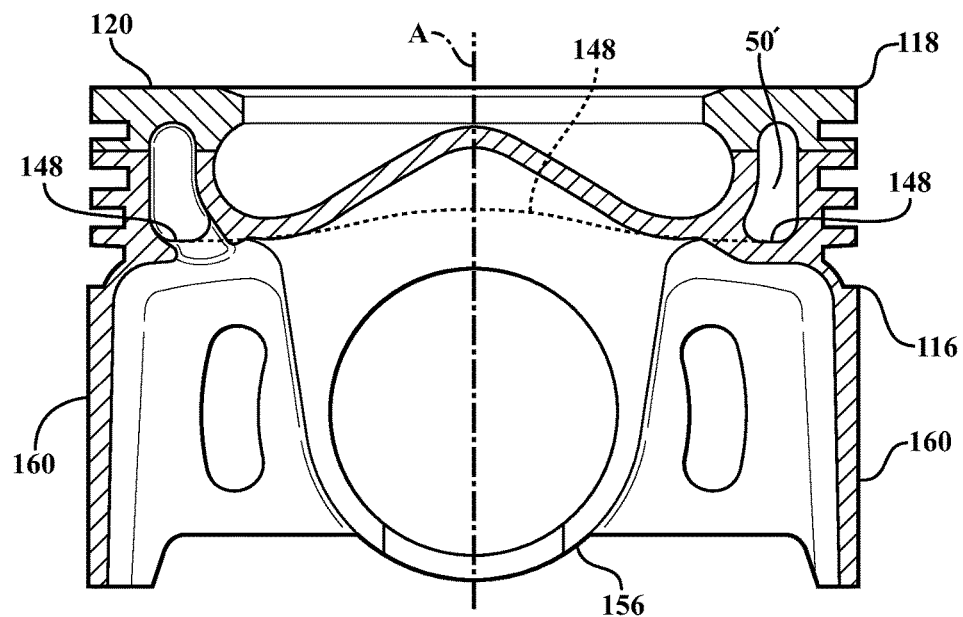
FIG. 7 is a cross-sectional side view of the piston of FIG. 6 taken generally through a longitudinal central axis and transversely to a pin bore axis of the piston.
Figure 7A:
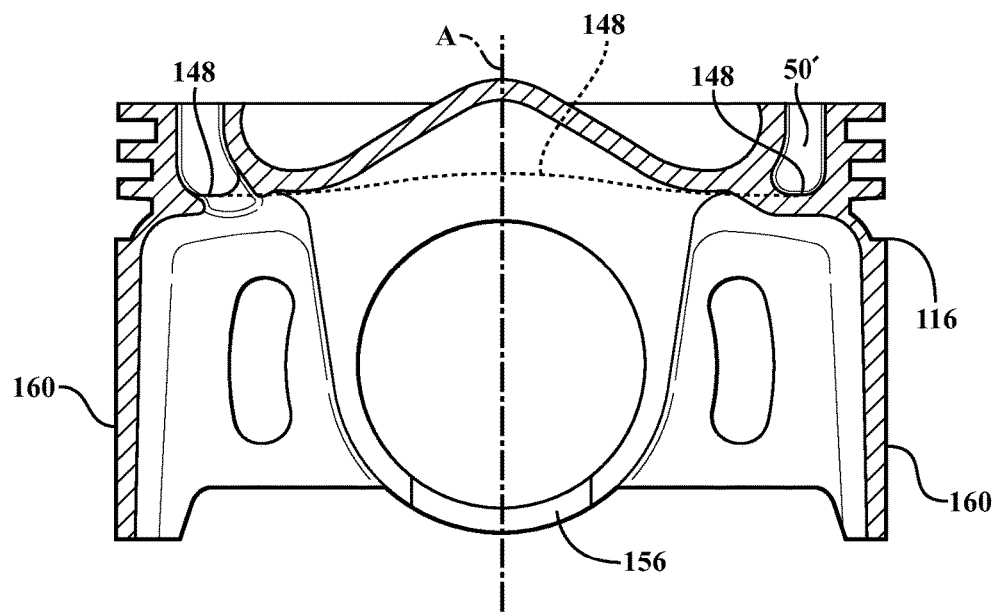
FIG. 7A is a cross-sectional side view of a bottom part of the piston of FIG. 6 taken generally along the same axis as FIG. 7.
Figure 8:
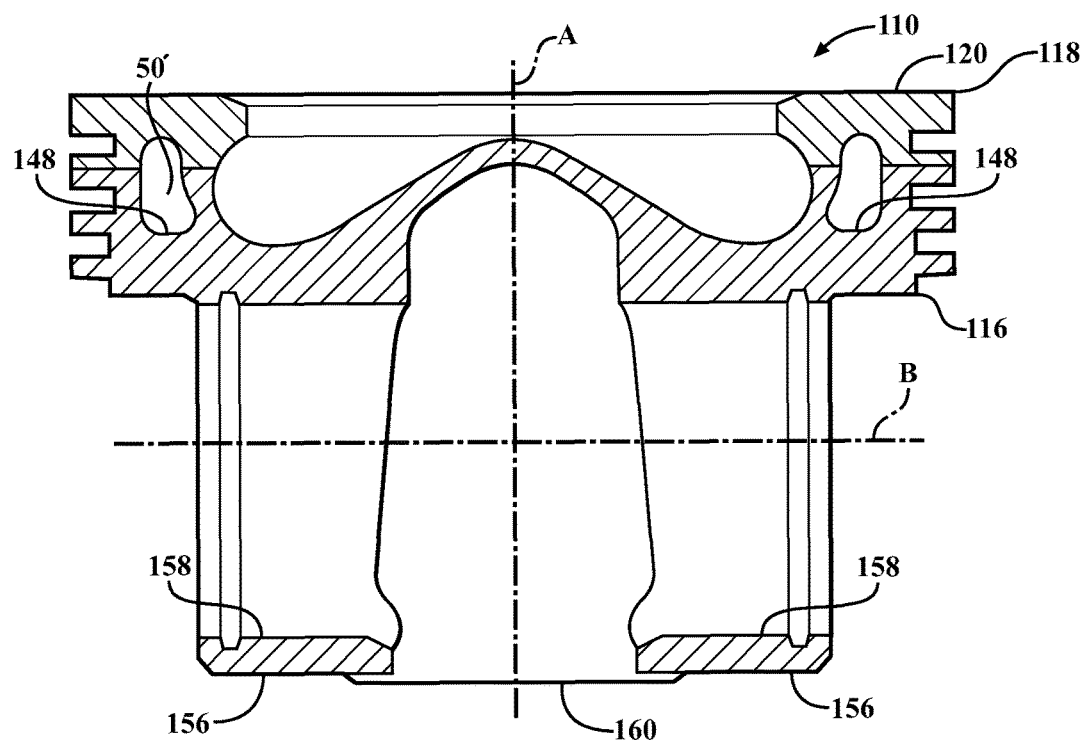
FIG. 8 is a cross-sectional side view of the piston of FIG. 6 taken generally along the pin bore axis.
Figure 8A:
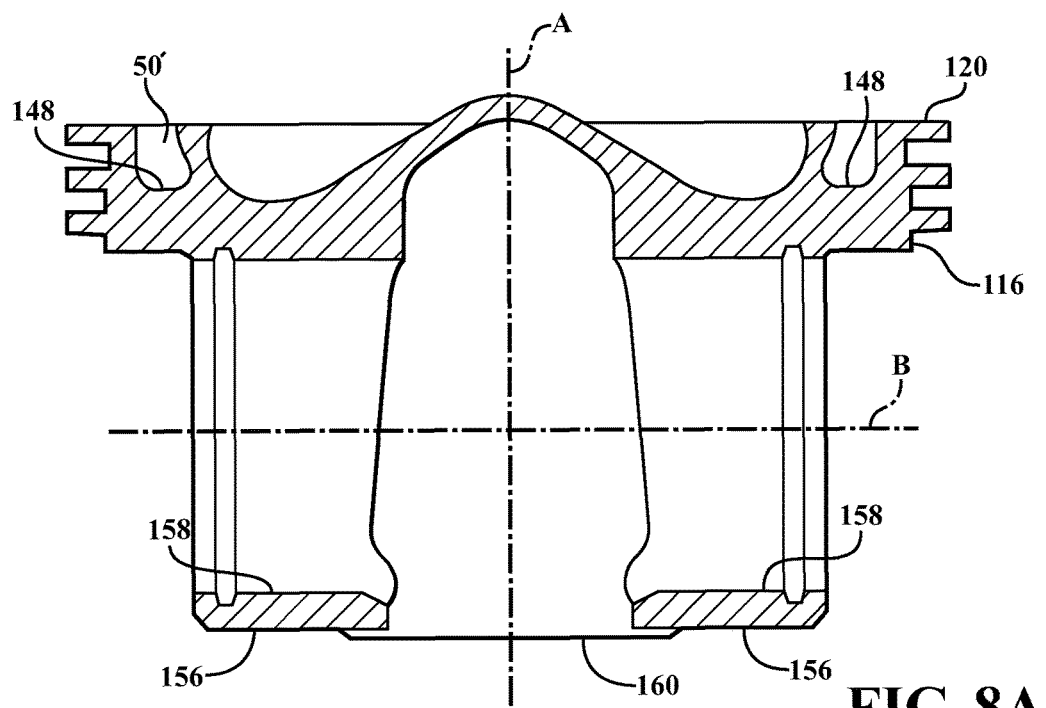
FIG. 8A is a cross-sectional side view of the bottom part of the piston of FIG. 6 taken generally along the same axis as FIG. 8.
Figure 11:
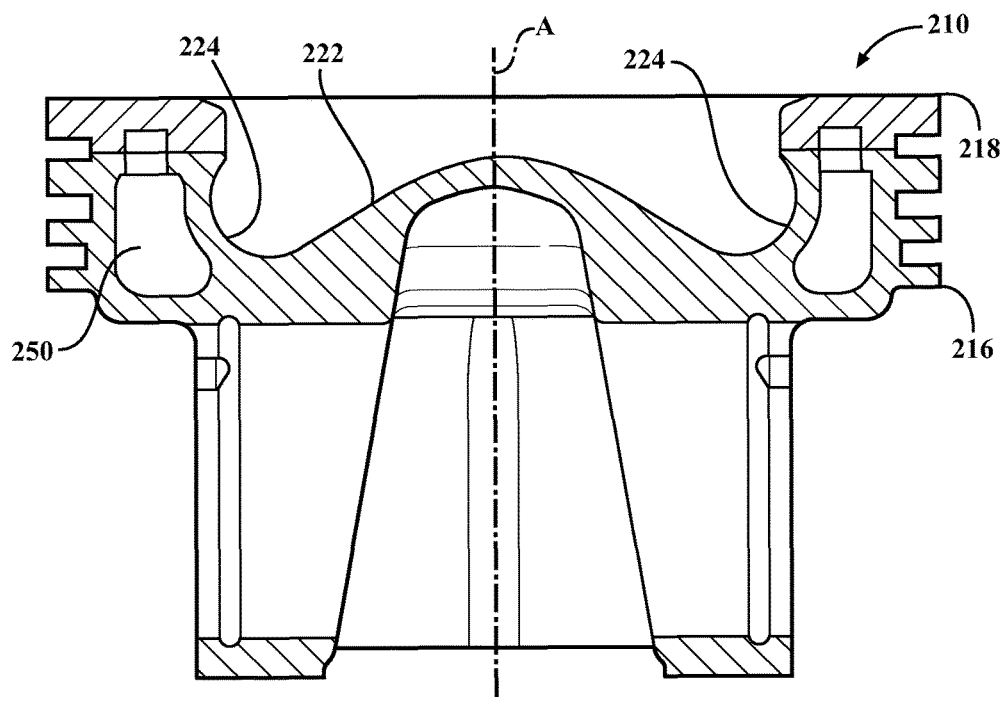
FIG. 11 is a cross-sectional side view of the piston of FIG. 10 taken generally along the pin bore axis.

The piston 110 is similar to the piston 10 discussed above, having a bottom part 116 welded to a top part 118, however, the compression height CH is able to be further reduced due to a difference in the configuration of a bottom portion 50' of an oil gallery formed between the bottom and top parts 116, 118. In particular, the configuration of the bottom portion 50' of the oil gallery with in the bottom part 116 is altered, with the portion of the oil gallery in the top part 118 remaining the same. Rather than the oil gallery being foamed having a symmetrically continuous annular configuration, the bottom portion 50' of the oil gallery within the bottom part 116 is fabricated having an undulating floor 148 (FIG. 9). The floor 148 retains the same or a similar depth over regions diametrically across a central pin bore axis 13, radially inwardly from skirt panels 160, as shown in FIGS. 7 and 7A, however, the floor 148 rises in smooth undulating fashion relative to the central longitudinally axis A in regions extending over laterally spaced pin bosses 156, as shown in FIGS. 8 and 8A. As such, pin bores 158 formed in the pin bosses 156 can be moved axially upwardly within the bottom part 116, thus, bringing the central pin bore axis B axially closer to a top wall 120 of the piston 110. Accordingly, the CH, measured from the central pin bore axis B to the top wall 120, is further reduced, thereby allowing the engine to be made yet more compact.

As shown in FIGS. 10-13, a piston 210 constructed in accordance with another aspect of the invention is shown, wherein the same reference numerals used above, offset by a factor of 200, are used to identify like features.

The piston 210 is similar to the piston 10 discussed above, having a bottom part 216 welded to a top part 218, however, rather than having a combustion bowl configured concentrically about a longitudinal central axis A, a combustion bowl 222 is radially offset relative to a longitudinal central axis A of the piston 210 such that the combustion bowl 222 is non-concentric in relation to the longitudinal central axis A. As such, in order to provide uniform cooling to the radially offset combustion bowl 222, a cooling gallery 250 is altered in comparison with the cooling gallery 50 of the piston 10. The top part 218, as with the top part 18 of the piston 10, includes an upper portion of the cooling gallery 250 that is concentric about the longitudinal central axis A and annularly symmetric, however, the bottom part 216 includes a lower part of the cooling gallery 250 that is radially offset in non-concentric relation to the longitudinal central axis A and also annularly asymmetrical. The reason for the asymmetrical configuration is to reduce weight of the piston 210, and the reason for the non-concentric configuration is to provide a wall 224 of the combustion bowl 222 with a symmetrically uniform, constant circumferential thickness. As such, the cooling is made uniform about the combustion bowl 222.

Figure 12:
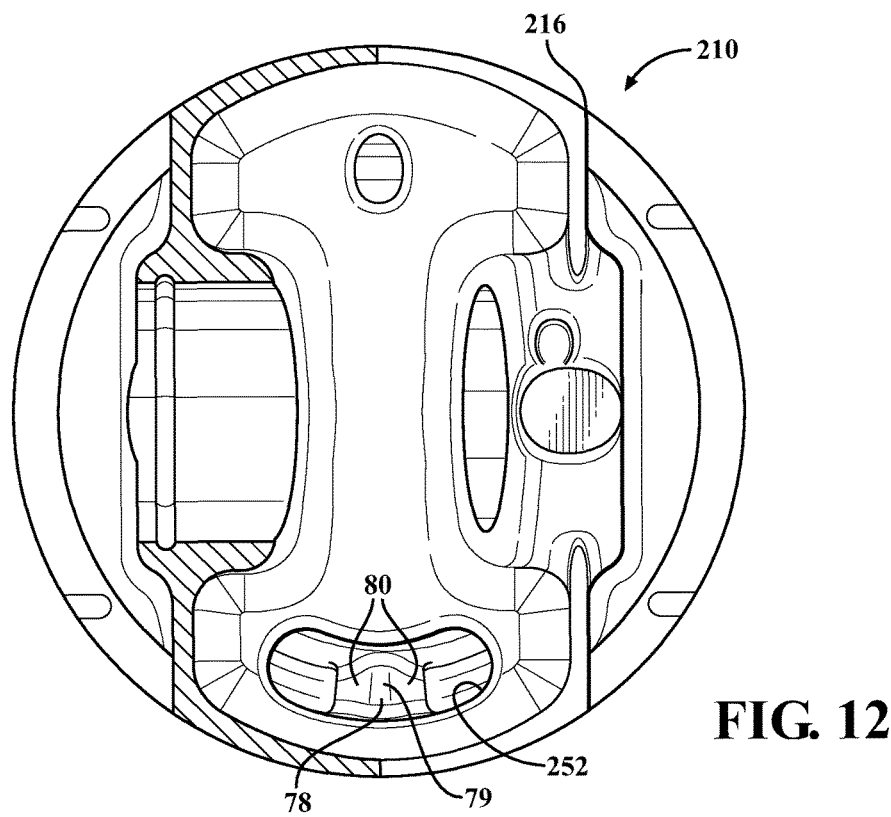
FIG. 12 is a bottom view of the piston of FIG. 10.
Figure 13:
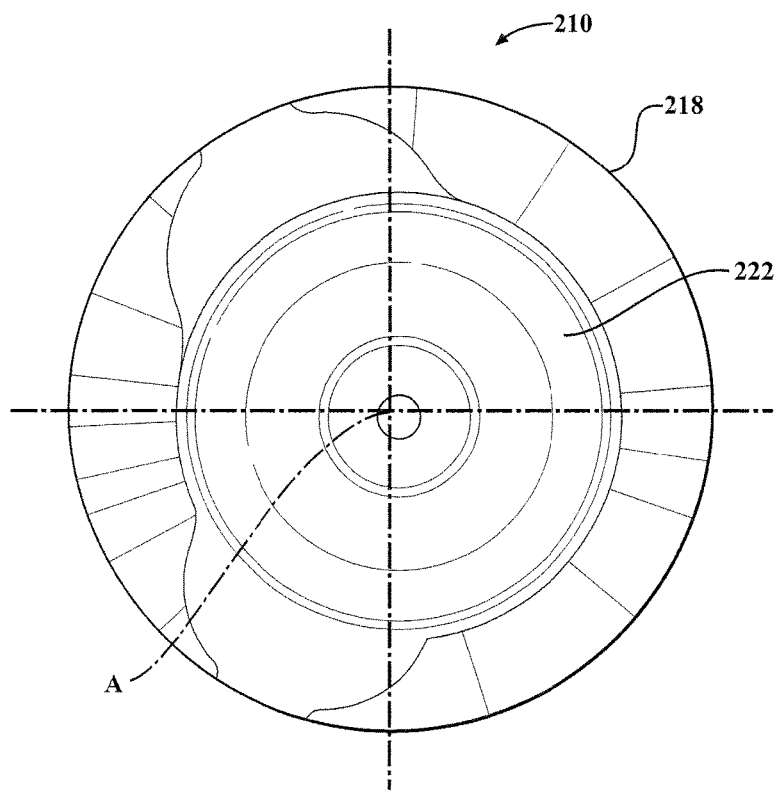
FIG. 13 is a top view of the piston of FIG. 10.

In addition to the difference discussed with regard to the cooling gallery 250, as shown in FIGS. 10 and 12, an "as cast" oil inlet 252 is shaped having an enlarged, arcuate, peanut-shaped configuration. This provides a target having an increased area through which an inclined oil jet (not shown) can inject oil into the cooling gallery 250. In addition to the inlet 252 having an enlarged size opening, an oil deflector 78 is provided "as cast" in the bottom part 216 to deflect injected oil uniformly to both sides of the deflector 78 for flow through both sides of the cooling gallery 250. The deflector 78 extends radially across an approximate midpoint of the oil inlet 252 to substantially bifurcate the oil inlet 252. The deflector 78 is generally triangular in shape, with an apex 79 of the deflector 78 facing downwardly adjacent the inlet 252 and opposite sides 80 of the deflector 78 diverging upwardly into the cooling gallery 250. As such, injected oil is defected off the opposite diverging sides to flow in generally equal volumes through the cooling gallery 250 to an oil outlet 254 formed "as cast" diametrically opposite the oil inlet 252. As such, the uniform thickness, non-concentric wall 224 is uniformly cooled, and the piston 210 is provide with a reduced overall weight.

FIGS. 14-17 illustrate another embodiment of the invention. A piston 300 is shown having an upper piston part 302 and a lower piston part 304. At least the lower piston part 304 is fabricated of ferrous-based material. Both parts 302, 304 may be fabricated of ferrous-based material. Both parts 302, 304 may be fabricated of steel of the same or different grade (e.g., SAE 4140).

The lower part 304 includes a pair of pin bosses 306 formed with associated pin bores 308 aligned along a common pin bore axis B. The lower part 304 further includes a pair of skirt portions panels 310 that are formed as one piece with the pin bosses 306 and out of the same material.

The upper 302 and lower 304 parts each include an outer annular wall 312, 314 and an inner annular wall 316, 318, respectively. The outer 312 and inner 316 walls of the upper part 302 present a channel portion 320 between the walls, and the outer 314 and inner 318 walls of the lower part 304 also present an associated channel portion 322 between the walls.

The inner 316, 318 and outer 320, 322 walls of the upper and lower piston portions 302, 304 are permanently joined across respective inner 324 and outer 326 weld joints to define therebetween an annular cooling gallery 328 that has two side walls provided by the joined together inner and outer walls, and annular upper wall 330 formed as part of the upper piston part 302, and a bottom wall 332 formed as part of the lower piston part 304.

The piston 300 further includes a combustion bowl 334 defined in part by the radially inner surface of the joined together inner walls, and in part by a generally dome-shaped bottom wall 336 that extends radially inwardly of the inner wall of the lower piston part 304 and is made as one piece with the lower piston part 304 of the same material.

The inner weld joint 324 is exposed to the combustion bowl 334. In other words, the location of the inner weld joint 324 is such that its inner margin it terminates at the combustion bowl surface 334 and at its outer margin it terminates at the radially inner wall of the cooling gallery 328. The inner weld joint 324 is spaced below the top wall 330 but spaced above the outer weld joint 326. One or both weld joints 324, 326 may be friction weld joints.

The piston 300 has a piston height, PH, whose dimension is measured from the bottom edge of the pin bosses 306 to a top face 338 of the upper wall 330. The piston 300 further includes a piston diameter, PD, which is measured as the outer diameter of the upper wall 330. The piston 300 also has a compression height, CH, which is measured as the distance from the pin bore axis B to the top face 338. According to this embodiment, a particular compact and strong piston is achieved when CH equals about 40 mm, D equals about 103 mm and the ratio of CH/PH is about ⅔. CH is between 38% and 45% of PD.

The outer surface of the outer walls 312, 314 are formed with a plurality of ring grooves 340, 342 and 344 in which rings 346, 348, 350 are accommodated. As shown best in FIGS. 15 and 16, the cooling gallery 328 extends both above and below the uppermost 340 and lowermost 344 ring grooves. This provides a high degree of cooling capability for a very compact piston.

The lower, radially innermost corner 352 of the cooling gallery 328 undercuts the combustion bowl 334 such that the corner 352 extends radially inwardly beyond a radially outermost region 354 of the combustion bowl 334. This provides enhanced cooling of the bowl 334. The lower corner 352 also extends radially inward of an upper radially inner most corner 356 of the cooling gallery 328, such that the gallery is wider at the bottom than at the top. Also, the outermost region 354 lies longitudinally and radially between the lower and upper corners 352, 356 of the gallery 328 for optimum cooling in a compact design. The inner and outer weld joints 324, 326 also lie longitudinally between the lower and upper corners 352, 356 of the cooling gallery 328.

Figure 14:
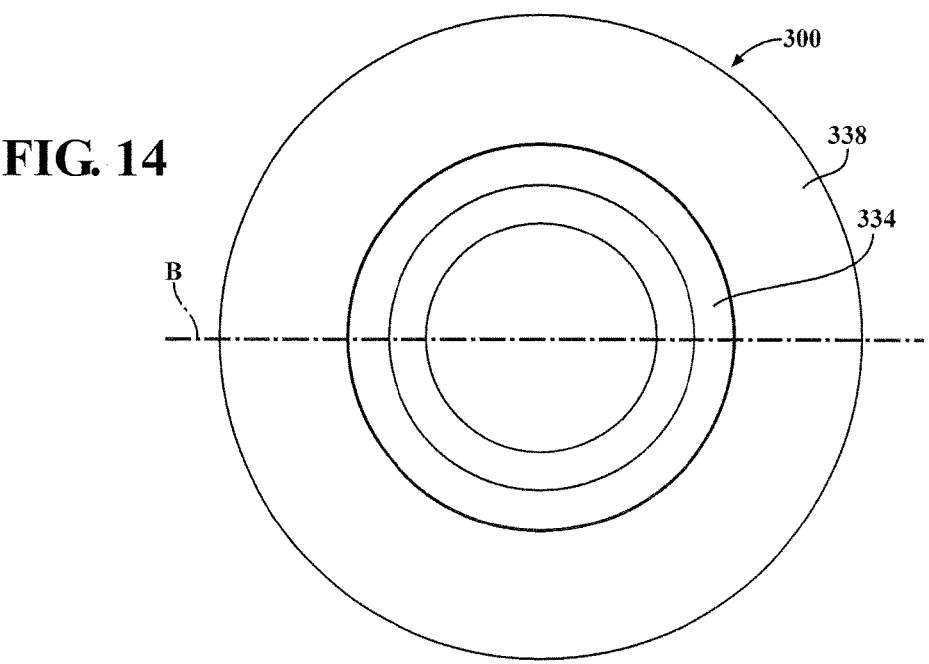
FIG. 14 is a top view of an alternative embodiment of the invention.
Figure 16:
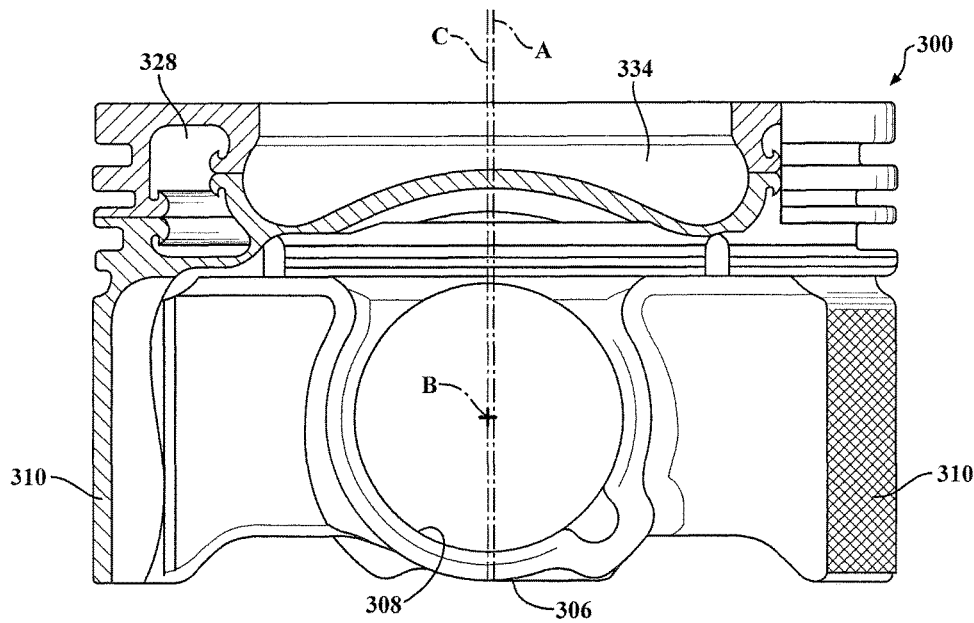
FIG. 16 is a cross-sectional view taken generally along lines 16-16 of FIG. 14.
Figure 17:
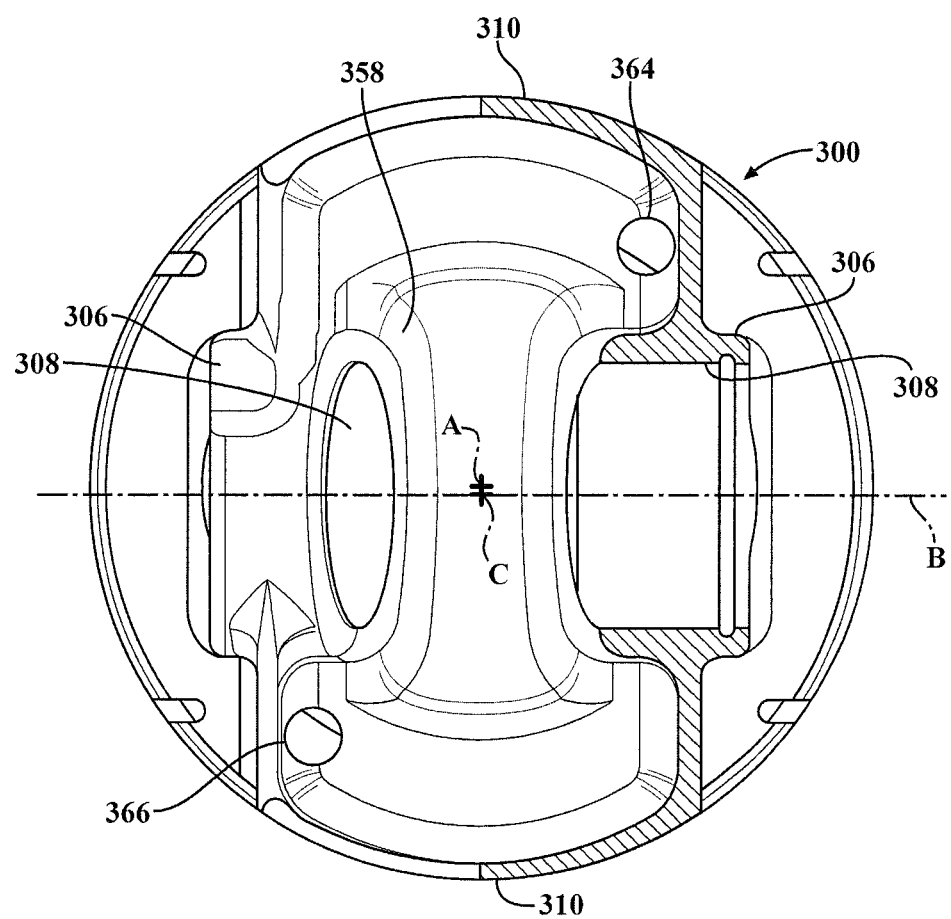
FIG. 17 is a bottom view of the piston of FIG. 14.

As shown in FIGS. 14, 16 and 17, the piston includes a central longitudinal axis A and the pin bores include a longitudinal axis C. The axis C is transverse to axis B. The axis C is further parallel to axis A but is laterally offset from axis A. The offset distance in this embodiment is about 0.5 mm. The pin bores are offset closer to the thrust side than the anti-thrust side.

Figure 15:
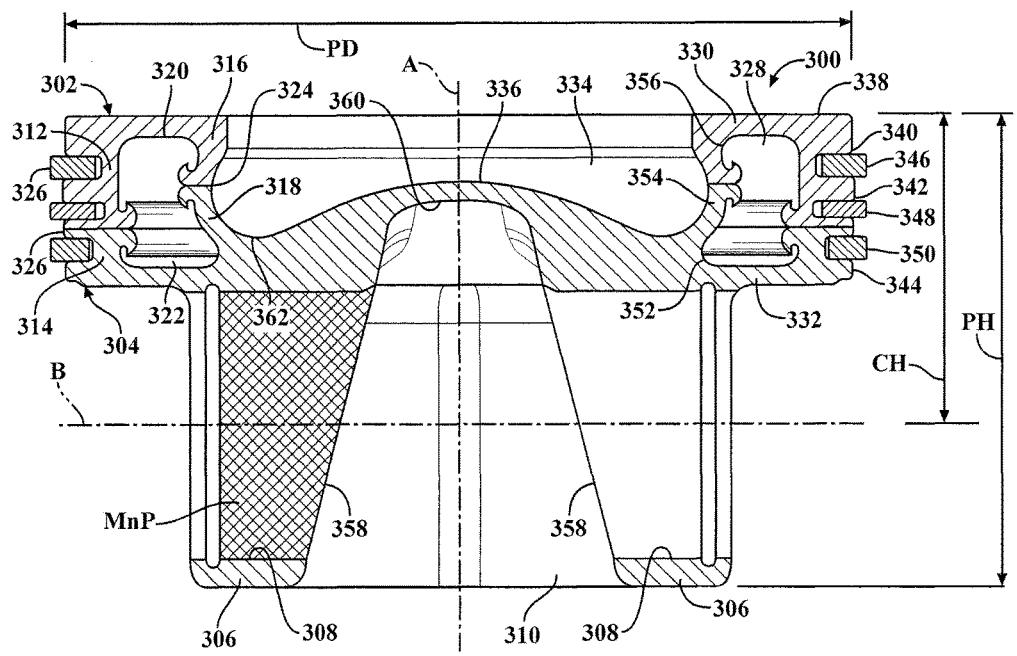
FIG. 15 is cross-sectional view taken generally along lines 15-15 of FIG. 14.

As best shown in FIG. 15, the pin bosses 306 have inner faces 358 that are substantially planar along their lengths (except for rounding relief at the corners). The faces 358 diverge away from one another in the direction from top to bottom at a fixed single angle. The pin bosses 306 merge at their top into the wall 336 and floor 332. The pin bosses 306 are of constant increasing width from bottom to top with no necking or thinning at the top. The space 360 at the top between the pin bosses 306 extends above the bottom wall 332 of the cooling gallery 328 and above the lowest region 362 of the combustion bowl 334. This contributes to the compact design of the piston.

The bottom wall 332 is formed with a pair of openings 364, 366 for introducing and draining oil from the gallery 328.

The piston skirt portions 310 are coated with graphite and the pin bores 308 are bushingless and coated with manganese phosphate.

Obviously, many modifications and variations of the present invention are possible in light of the above teachings. It is, therefore, to be understood that within the scope of the appended claims, the invention may be practiced otherwise than as specifically described.

What is claimed is:

1. A piston for an internal combustion diesel engine, comprising:
   an upper piston part;
   a lower piston part, at least said lower piston part being fabricated from a ferrous based material, said lower piston part having a pair of pin bosses formed with associated pin bores aligned along a pin bores axis which extends transversely to a central longitudinal axis along which the piston reciprocates, said lower piston part further including a pair of piston skirt portions that are formed of one piece with said pin bosses of the same material;
   said upper and lower piston parts each including an outer annular wall and an inner annular wall spaced radially apart from one another and presenting a channel portion between each of said inner and outer walls, said inner and outer walls of said upper piston part being permanently joined across inner and outer weld joints to said respective inner and outer walls of said lower piston part to define therebetween an annular cooling gallery that has two side walls provided by the joined together inner and outer walls, an annular top wall formed by the upper piston part and a bottom wall formed by the lower piston part, said bottom wall forming a floor of said annular cooling gallery, said floor undulating relative to said central longitudinal axis along a pair of diametrically opposite low portions and a pair of diametrically opposite high portions, each of said high portions extending over separate ones of said pin bosses and each of said diametrically opposite low portions extending continuously between said pair of diametrically opposite high portions;
   said joined together upper and lower piston parts including a combustion bowl defined in part by an inner surface of said joined together inner walls, and further including a generally dome-shaped bottom wall of said combustion bowl extending radially inwardly of said inner wall of said lower piston part;
   said inner weld joint being exposed to said combustion bowl;
   said joined together piston parts including a piston height dimension, PH, measured from a bottom edge of said pin bosses to a top face of said top wall;
   said joined together piston parts including a compression height dimension, CH, measured from said pin bore axis to said top face of said top wall;
   said joined together piston parts including a piston diameter, PD, measured as the outer diameter of the top wall; and
   wherein said PD equals about 103 mm, said CH equals about 40 mm and the ratio of CH/PH equals about 2/3.

2. The piston of claim 1 wherein said upper and lower piston parts are fabricated of steel.

3. The piston of claim 1 wherein said weld joints are friction weld joints.

4. The piston of claim 1 wherein an outer surface of said outer walls of said upper and lower piston parts are formed with a plurality of ring grooves, and said cooling gallery extends both above and below said plurality of ring grooves.

5. The piston of claim 1 wherein said inner weld joint is spaced above said outer weld joint.

6. The piston of claim 1 wherein said joined together upper and lower piston parts include a central longitudinal piston axis and said pin bores include a longitudinal pin axis that is parallel to but laterally offset from said piston axis.

7. The piston of claim 6 wherein said offset is about 0.5 mm.

8. The piston of claim 1 wherein said pin bores are coated with manganese phosphate and are free of insert bearings or bushings.

9. The piston of claim 8 wherein said skirt portions are coated with graphite.

10. The piston of claim 1 wherein said pin bosses have inner face surfaces that are substantially planar along their length and diverge away from one another at a fixed single angle from top to bottom when view in cross section.

11. The piston of claim 10 wherein the space between said pin bosses extends above the bottom wall of said gallery and above a lowest region of said combustion bowl.

12. The piston of claim 1 wherein a lower and radially innermost corner of said cooling gallery extends radially inwardly beyond a radially outermost region of said combustion bowl.

13. The piston of claim 12 wherein said lower corner of said cooling gallery extends radially inward beyond an upper and radially inner most corner of said cooling gallery.

14. The piston of claim 13 wherein said radially outer most region of said combustion bowl lies radially between said lower and upper corners of said cooling gallery.

15. The piston of claim 14 wherein said inner weld joint lies between said upper and lower corners of said cooling gallery.

16. The piston of claim 15 wherein said outer weld joint lies below said inner weld joint.

17. The piston of claim 1 including a pair of openings in said bottom wall to provide open passages into said cooling gallery for the introduction and removal of cooling oil into and out of said cooling gallery.

18. A piston for an internal combustion diesel engine, comprising:
   an upper piston part having radially spaced inner and outer joining surfaces;
   a lower piston part with radially spaced inner and outer joining surfaces and fabricated of ferrous based material;
   inner and outer weld joints permanently joining said inner and said outer joining surfaces of said upper and said lower piston parts, respectively, and defining a cooling gallery therebetween and a combustion bowl inward of said cooling gallery and open to a top of the piston, said cooling gallery having a floor;
   said inner weld joint extending between said cooling gallery and said combustion bowl;
   said lower piston part including a pair of pin bosses and associated pin bores aligned along a common pin bore axis which extends transversely to a central longitudinal axis along which the piston reciprocates, and a pair of skirt portions formed as one piece with said pin bosses of the same material, said floor of said cooling gallery undulating relative to said central longitudinal axis along a pair of diametrically opposite low portions and a pair of diametrically opposite high portions, each of said diametrically opposite high portions extending over said pin bosses and each said pair of diametrically opposite low portions extending continuously between said pair of diametrically opposite high portions;

said piston having a top face with an outer piston diameter, PD, and a compression height, CH, measured as the distance from said pin bore axis to said top face of said piston; and wherein CH is between 38% to 45% of PD.

\* \* \* \* \*

UNITED STATES PATENT AND TRADEMARK OFFICE
CERTIFICATE OF CORRECTION

| | |
|---|---|
| PATENT NO. | : 9,970,384 B2 |
| APPLICATION NO. | : 13/112772 |
| DATED | : May 15, 2018 |
| INVENTOR(S) | : Florin Muscas |

Page 1 of 1

It is certified that error appears in the above-identified patent and that said Letters Patent is hereby corrected as shown below:

In the Specification

Column 4, Line 17 "form in of" should read --form of--
Column 4, Line 27 "is east of" should read --is cast of--
Column 5, Line 44 "form" should read --formed--
Column 6, Line 37 "as east" should read --as cast--
Column 6, Line 67 "as east" should read --as cast--
Column 8, Line 48 "foamed" should read --formed--
Column 8, Line 52 "bore axis 13" should read --bore axis B--
Column 9, Line 9 "howl" should read --bowl--
Column 10, Line 67 "wail" should read --wall--

Signed and Sealed this
Ninth Day of October, 2018

Andrei Iancu
*Director of the United States Patent and Trademark Office*